United States Patent
Dhong et al.

(10) Patent No.: US 6,574,698 B1
(45) Date of Patent: Jun. 3, 2003

(54) METHOD AND SYSTEM FOR ACCESSING A CACHE MEMORY WITHIN A DATA PROCESSING SYSTEM

(75) Inventors: Sang Hoo Dhong, Austin, TX (US); Joel Abraham Silberman, Somers, NY (US)

(73) Assignee: International Business Machines Corporation, Armonk, NY (US)

( * ) Notice: Subject to any disclaimer, the term of this patent is extended or adjusted under 35 U.S.C. 154(b) by 606 days.

(21) Appl. No.: 09/062,002

(22) Filed: Apr. 17, 1998

(51) Int. Cl.[7] .............................................. G06F 12/00
(52) U.S. Cl. ............................ 711/3; 711/205; 711/206
(58) Field of Search ................................. 711/104, 114, 711/108, 202, 203, 204, 205, 206, 207, 208, 209, 211, 3

(56) References Cited

U.S. PATENT DOCUMENTS

| | | | | |
|---|---|---|---|---|
| 4,797,814 A | * | 1/1989 | Brenza | ........................ 364/200 |
| 5,299,147 A | | 3/1994 | Holst | |
| 5,835,928 A | * | 11/1998 | Auslander et al. | .............. 711/3 |
| 5,970,512 A | * | 10/1999 | Martens et al. | .............. 711/205 |
| 5,996,062 A | * | 11/1999 | Sachs | ........................ 711/203 |

* cited by examiner

Primary Examiner—Reginald G. Bragdon
Assistant Examiner—Pierre M. Vital
(74) Attorney, Agent, or Firm—Casimer K. Salys; Bracewell & Patterson, L.L.P.

(57) ABSTRACT

A method for accessing a cache memory within a data processing system is disclosed. The cache memory includes a memory array and a directory along with a translation lookaside buffer. The cache memory may be accessed by an effective address that includes a byte field, a line field, and an effective page number field. In order to facilitate the cache access process, a translation array is provided that has the same number of rows as the translation lookaside buffer. Each row of the translation array has the same number of array entries as the product of the number of lines per page of a system memory and the set associativity of the cache. The translation array is updated after the contents of the directory or the translation lookaside buffer have been updated. The translation array can be accessed with the contents of a line field of an effective address to determine whether or not the cache memory stores data associated with translated address.

10 Claims, 3 Drawing Sheets

METHOD AND SYSTEM FOR ACCESSING A CACHE MEMORY WITHIN A DATA PROCESSING SYSTEM

BACKGROUND OF THE INVENTION

1. Technical Field

The present invention relates to a method and system for data processing in general, and in particular to a method and system for enhancing the speed of a memory access within a data processing system. Still more particularly, the present invention relates to a method and system for accessing a cache memory within a data processing system.

2. Description of the Prior Art

A common way of organizing a main memory within a data processing system for memory access is by dividing the main memory into blocks of contiguous locations called pages, each page having a same number of lines, each line having a same number of bytes. Accordingly, an address utilized to access the main memory typically includes a page number, a line number, and a byte location. Such an address is commonly referred to as a real address (RA) or physical address. However, when a virtual addressing scheme is being utilized, the access address is then referred to as an effective address (EA) or virtual address. Given the fact that instructions or data are relocatable within the virtual addressing scheme, the effective address or virtual address must be mapped back to a corresponding real address or physical address that specifies an actual location within the main memory. Nevertheless, because the main memory is conceptually divided in pages, as mentioned previously, the low-order bits of an effective address that typically identify a byte within a page of the main memory usually do not require any translation, while only the high-order bits of the effective address are required to be translated to a corresponding real page address that specifies the actual page location within the main memory.

In order to increase the speed of access to the data stored within the main memory, modern data processing systems generally maintain the most recently used data in a high-speed memory known as a cache memory. This cache memory has multiple cache lines, with several bytes per cache line for storing information in contiguous addresses within the main memory. In addition, each cache line has an associated tag that typically identifies a partial address of a corresponding page of the main memory. Because the information within each cache line may come from different pages of the main memory, the tag provides a convenient way to identify to which page of the main memory a cache line belongs.

In a typical cache memory implementation, information is stored in one or several memory arrays. In addition, the corresponding tags for each cache line are stored in a structure known as a directory or tag array. Usually, an additional structure, called a translation lookaside buffer (TLB), is also utilized to facilitate the translation of an effective address to a real address during a cache memory access.

In order to access a byte in a cache memory with an effective address, the line portion (mid-order bits) of the effective address is utilized to select a cache line from the memory array along with a corresponding tag from the directory. The byte portion (low-order bits) of the effective address is then utilized to choose the indicated byte from the selected cache line. At the same time, the page portion (high-order bits) of the effective address is translated via the translation lookaside buffer to determine a real page number. If the real page number obtained by this translation matches the real address tag stored within the directory, then the data read from the selected cache line is the data actually sought by the program. This is commonly referred to as a cache "hit," meaning the requested data was found in the cache memory. If the real address tag and translated real page number do not agree, a cache "miss" occurs, meaning that the requested data was not stored in the cache memory. Accordingly, the requested data have to be retrieved from the main memory or elsewhere within the memory hierarchy.

With a direct-mapped cache, only one of the group of corresponding lines from all pages in a real memory page can be stored in the cache memory at a time; but in order to achieve a better "hit" ratio, sometimes a set-associative cache is utilized instead. For example, with an N-way set associative cache, corresponding lines from N different pages may be stored. Since all entries can be distinguished by their associated tags, it is always possible to resolve which of the N lines having the same line number contains the information a program requested. The resolution requires comparison of the translated real page number to the N tags associated with a given line number. Each comparison generates an input to an N-to-1 multiplexor to select an appropriate cache line from among the N possibilities.

Regardless of the cache architecture being utilized, the critical path for address translation still includes a translation lookaside buffer, a directory and a group of comparison circuits, which must be utilized during a cache access to select an appropriate cache line within the cache memory. Because this critical path can contribute certain unnecessary delays to the entire cache access process, it would be desirable to provide an improved method and system for address translation during a cache access within a data processing system.

SUMMARY OF THE INVENTION

In view of the foregoing, it is therefore an object of the present invention to provide an improved method and system for data processing.

It is another object of the present invention to provide an improved method and system for enhancing the speed of a memory access within a data processing system.

It is yet another object of the present invention to provide an improved method and system for accessing a cache memory within a data processing system.

In accordance with a preferred embodiment of the present invention, a cache memory includes a memory array and a directory along with a translation lookaside buffer. The cache memory may be accessed by an effective address that includes a byte field, a line field, and an effective page number field. In order to facilitate the cache access process, a translation array is provided that has the same number of rows as the translation lookaside buffer. Each row of the translation array has the same number of array entries as the product of the number of lines per page of memory and the set associativity of the cache. The translation array is updated after the contents of the directory or the translation lookaside buffer have been updated. The translation array can be accessed with the contents of a line field of an effective address to determine whether or not the cache so memory stores data associated with translated address.

All objects, features, and advantages of the present invention will become apparent in the following detailed written description.

DESCRIPTION OF THE DRAWINGS

The invention itself, as well as a preferred mode of use, further objects, and advantages thereof, will best be understood by reference to the following detailed description of an illustrative embodiment when read in conjunction with the accompanying drawings, wherein.

DESCRIPTION OF A PREFERRED EMBODIMENT

The present invention may be executed in a variety of processors having a cache memory. The cache memory may be, for example, a primary cache, a secondary or a tertiary cache.

Figure 1:
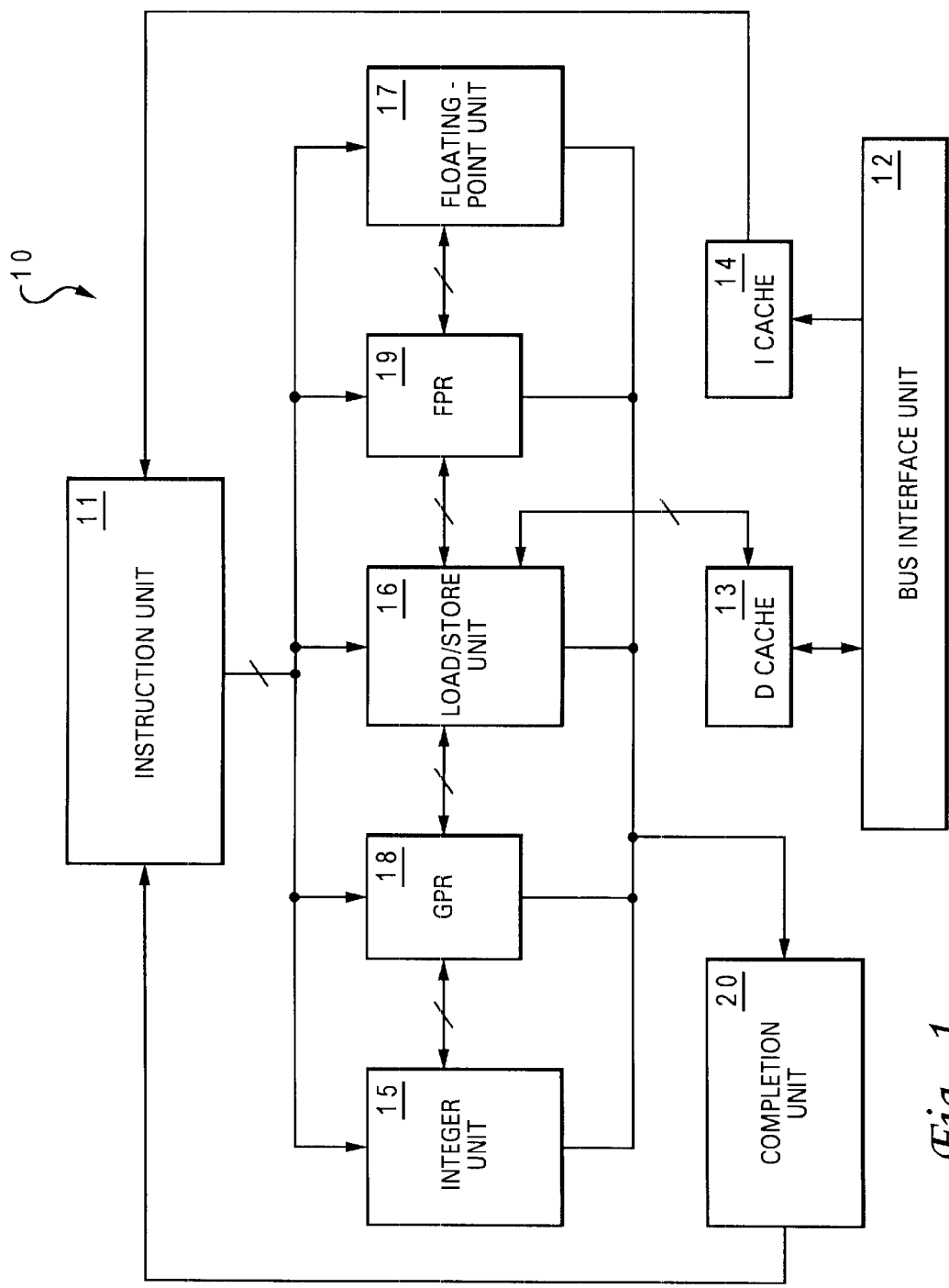
FIG. 1 is a block diagram of a processor in which a preferred embodiment of the present invention may be incorporated; porated.

Referring now to the drawings and in particular to FIG. 1, there is depicted a block diagram of a processor in which a preferred embodiment of the present invention may be incorporated. Within a processor 10, a bus interface unit 12 is coupled to a data cache 13 and an instruction cache 14. Both data cache 13 and instruction cache 14 are high speed set-associative caches which enable processor 10 to achieve a relatively fast access time to a subset of data or instructions previously transferred from a main memory (not shown). Instruction cache 14 is further coupled to an instruction unit 11 which fetches instructions from instruction cache 14 during each execution cycle.

Processor 10 also includes three execution units, namely, an integer unit 15, a load/store unit 16, and a floating-point unit 17. Each of execution units 15–17 can execute one or more classes of instructions, and all execution units 15–17 can operate concurrently during each processor cycle. After execution has terminated, execution units 15–17 store data results to a respective rename buffer, depending upon the instruction type. Then, any one of execution units 15–17 signals a completion unit 20 that the instruction unit has been finished. Finally, instructions are completed in program order by transferring result data from the respective rename buffer to a general purpose register 18 or a floating-point register 19.

Figure 2:
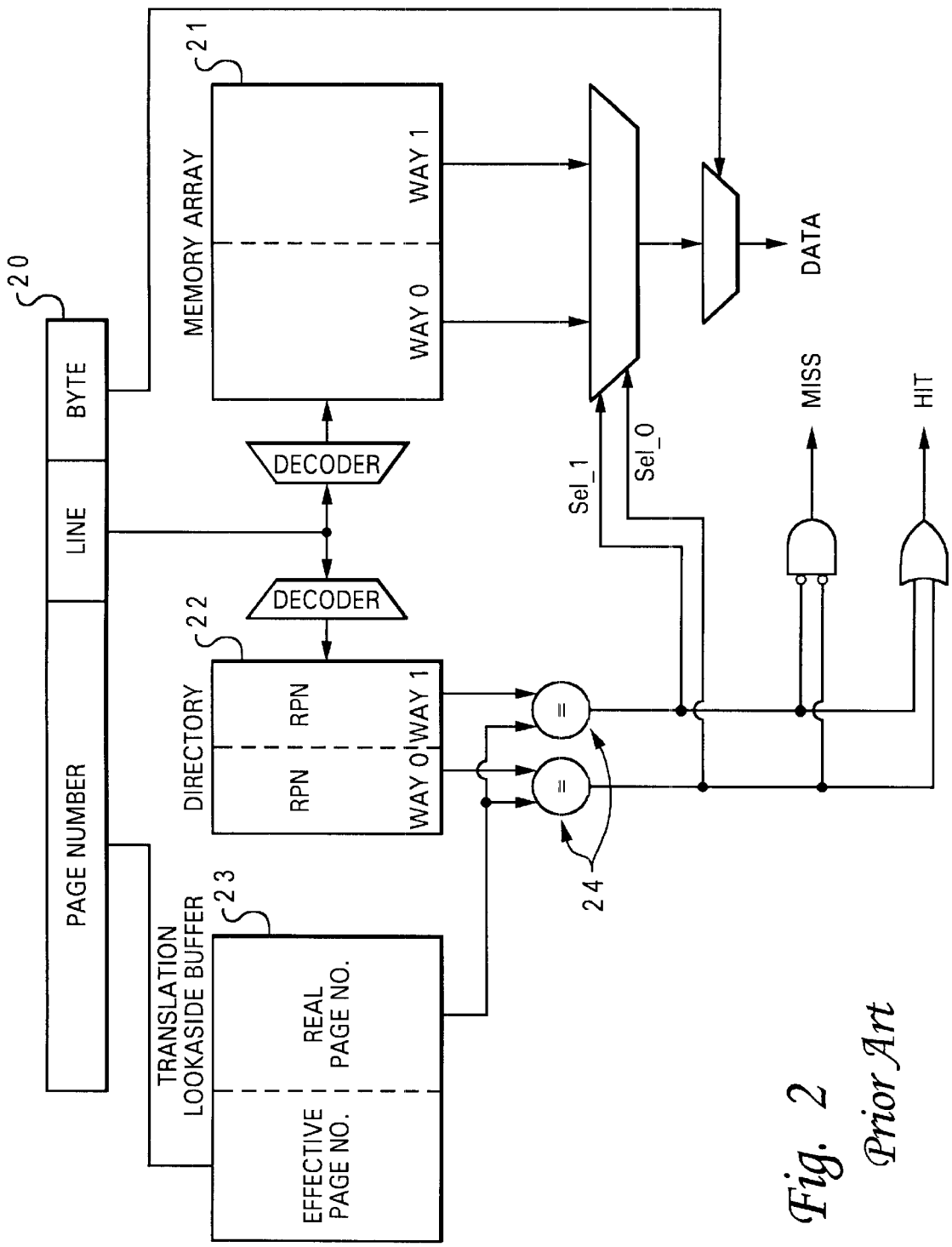
FIG. 2 is a block diagram of a set-associative cache memory along with a method of access according to the prior art.

With reference now to FIG. 2, there is illustrated a block diagram of a set-associative cache memory along with a method of access, according to the prior art. The set-associative cache memory may be a data cache or an instruction cache. As shown, the set-associative cache memory includes a memory array 21 along with a directory 22, both of which are divided into two ways, namely, way 0 and way 1. Each cache line in memory array 21 has a corresponding row in directory 22. The data or instructions portion of a cache line is maintained in memory array 21 while the tag portion of the same cache line is maintained in directory 22. Also shown in FIG. 2 is a translation lookaside buffer (TLB) 23 for translating an effective address to a corresponding real address. Specifically, TLB 23 only translates the page number portion of an effective address (or effective page number) to a corresponding real page number.

The information stored in memory array 21 may be accessed by an effective address 20. Effective address 20 includes a byte field, a line field, and a page number field. The line field of effective address 20 is utilized to select a specific cache line within memory array 21, and the byte field of effective address 20 is utilized to index a specific byte within the selected cache line. In addition, the page number field of effective address 20 is sent to TLB 23 to be translated to a corresponding real page number. This real page number is utilized for comparison with a tag of the selected cache line from directory 22 in order to determine whether there is a cache "hit" or "miss." Incidentally, a match between a tag from one of two ways in directory 22 and the real page number implies a cache "hit."

As shown in FIG. 2, the critical path for translating an effective page number to a real page number includes TLB 23, directory 22 and comparison circuits 24. In most cases, the bottleneck of this prior art configuration specifically lies upon the page number translation path. This bottleneck may contribute an additional one or two cycles to the entire cache access process.

Figure 3:
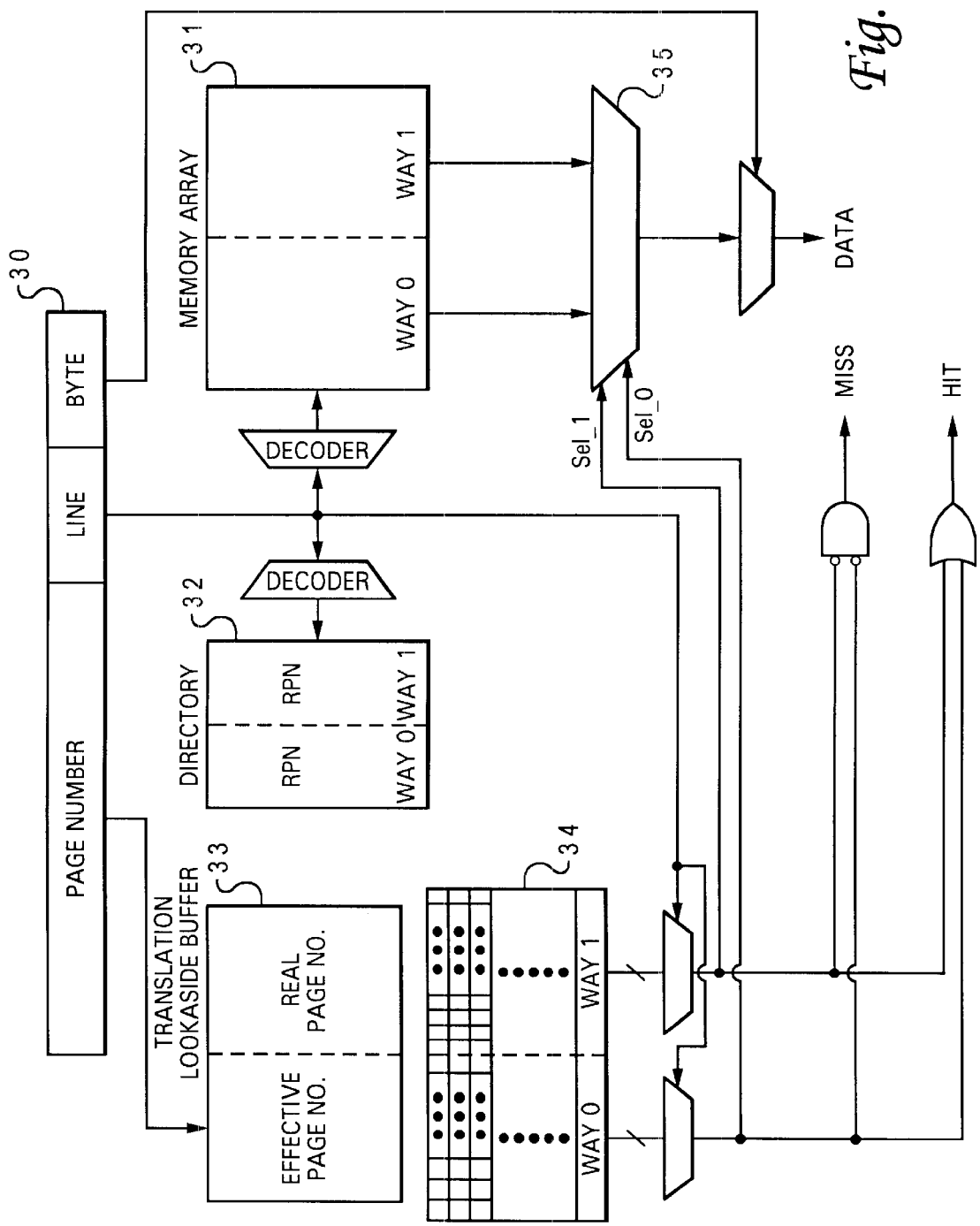
FIG. 3 is a block diagram of a set-associative cache memory having a translation array in accordance with a preferred embodiment of the present invention.

Referring now to FIG. 3, there is illustrated a block diagram of a set-associative cache memory along with a method of access, in accordance with a preferred embodiment of the present invention. Similar to the set-associated cache memory from FIG. 2, set-associative cache memory in FIG. 3 includes a memory array 31 and a directory 32, both of which are divided into two ways-way 0 and way 1, both of which have multiple cache lines. The data or instructions portion of a cache line is maintained in memory array 31, while the tag portion of the same cache line is maintained in directory 32. The set-associative cache memory may be a data cache, an instruction cache, or an unified cache storing both data and instructions.

The information stored in memory array 31 may be accessed by an effective address 30. Effective address 30 includes a page number field for indicating a virtual page within the main memory, a line field for selecting a specific cache line within the virtual page, and a byte field for indexing a specific byte within the selected cache line. For example, for a four-Kbyte page having 32 cache lines, the byte field would be seven bits wide and the line field would be five bits wide.

In accordance with a preferred embodiment of the present invention, a translation array 34 is utilized to store information extracted from directory 32 and a TLB 33. Translation array 34 has the same number of row entries as TLB 33. For example, if TLB 33 has 256 row entries, translation array 34 will have 256 row entries also. In addition, translation array 34 has the same number of ways as directory 32. As shown, translation array 34 has two ways, which is the same as directory 32. Within each way of translation array 34, each row has a number of array entries (one bit each) that correspond to the number of cache lines per page. For example, if a page has 32 cache lines, then translation array 34 will have 32 array entries in each row of each way. Preferably, translation array 34 is a content-addressable memory.

Each real address tag for a cache line within directory 32 is preferably represented by a logical "1" in a corresponding array entry within translation array 34. One central aspect of the present invention is the recognition that, within TLB 33, a given effective address maps to only one real address. Hence, with arrangement of the array entries within translation array 34 as described previously, each array entry (one bit) in translation array 34 is uniquely located by an effective page number, a line number, and a way number. Each array entry with a logical "1" indicates a corresponding cache line of a given real page is currently present in directory 32. Accordingly, a cache access can be performed by utilizing translation array 34, while bypassing TLB 33.

Translation array 34 may be accessed by either the column or the row. Because each way of translation array 34 has the same number of columns as the number of cache lines on a page, the line number of effective address 30 is utilized to access translation array 34 by the column. Otherwise, translation array 34 can be accessed by utilizing the effective page number of effective address 30 to locate a corresponding row number.

The array entries within translation array 34 need to be updated when there are content changes in either directory 32 or TLB 33. If a row entry in TLB 33 is replaced with a new valid entry, the real page number portion of TLB 33 must be compared with all real address tags in directory 32. The positions of all real address tags in directory 32 that match the new real page number in TLB 33 are resolved into line numbers based on the corresponding physical position of the real address tags in directory 32. The collection of all line numbers that match is recorded as a bit vector, one vector per way within directory 32. The vector for each way is stored in a row of translation array 34 that corresponds to the row of TLB 33 that receives the new entry. However, when a row entry in TLB 33 is invalidated, no action regarding the array entries within translation array 34 is required. This is because an entry marking a row entry within TLB 33 as valid is presumably needed in the basic translation mechanism that demands finding a valid row entry in TLB 33 to be a prerequisite for a successful translation. When a row entry is invalidated, a translation fault is signaled, and any hit or miss indication will typically be ignored.

Each array entry within translation array 34 must also be updated when there is a change to the real address tags within directory 32. For example, when a cache line becomes invalid, the real address tag for that line must be compared against all real page numbers in TLB 33. The array entry in translation array 34, which is located in the row of the matching entry and in the column corresponding to the line number/way of the real address tag of the invalidated cache line, must be set to a logical "0." Also, when a cache line is replaced by another cache line, a similar procedure is followed. The real address tag of the cache line being replaced is compared, as mentioned above, in order to set array entries in translation array 34 to a logical "0." Then, the real address tag of the new line is compared to all real page numbers in TLB 33. The array entry in translation array 34, which is located in the row of matching entry and in the column corresponding to the cache line number/way of the real address tag of the replaced cache line, is set to a logical "1."

As a result of the present invention, instead of sending the effective page number of effective address 30 to TLB 33 for translation, the effective page number is sent to translation array 34 directly, and TLB 33 can be completely bypassed even though TLB 33 is still required for the translation of virtual page numbers to real page numbers. A "1" from one of the array entries within translation array 34 implies a cache "hit." The position of the "1" in translation array 34 also selects the appropriate way of memory array 31 via a multiplexor 35. This approach is advantageous when the path through the translation hardware, such as TLB 33, limits the overall cache access delay.

As has been described, the present invention provides an improved method and system for accessing a cache memory within a data processing system. The present invention eliminates the step of translating an effective page number to a real page number and the subsequent comparison of the real page number from the TLB and real address tag read from the directory, such that the speed of a cache access involving both directory access and tag comparison on a critical path address translation can be increased. The present invention is especially applicable to data processing systems having a main memory having a relatively small page size (e.g., four Kbytes) and cache memories constructed with a relatively low set associativity (e.g., two- to four-way). By eliminating the real page number and tag comparison, the present invention also allows the cache "hit" or "miss" indication to be sent back to the processor sooner.

Although a set-associated cache is utilized to illustrated a preferred embodiment of the present invention, it is understood by those skilled in the art the principles as disclosed may also be applicable to a direct-mapped cache.

While the invention has been particularly shown and described with reference to a preferred embodiment, it will be understood by those skilled in the art that various changes in form and detail may be made therein without departing from the spirit and scope of the invention.

What is claimed is:

1. A method for accessing a cache memory within a data processing system utilizing an effective address, wherein said effective address includes a byte field, a line field, and an effective page number field, wherein said cache memory includes a memory array along with a directory and a translation lookaside buffer, said method comprising the steps of:

provide a translation array that includes an identical number of rows as in said translation lookaside buffer, and an identical number of array entries within each row as the product of cache lines per page of a system memory and an associativity of said cache memory; and in response to a cache access by an effective address, determining whether or not said cache memory stores data associated with said effective address utilizing said translation array.

2. The method according to claim 1, wherein said determining step further includes a step of utilizing a line field of said effective address to access said translation array.

3. The method according to claim 2, wherein said determining step further includes a step of detecting one of said array entries having an indication of a match.

4. The method according to claim 1, wherein said method further includes a step of updating said translation array after the contents within said directory or said translation lookaside buffer has been updated.

5. The method according to claim 1, wherein said directory contains real page numbers and said translation lookaside buffer is for translating effective page numbers to real page numbers.

6. A processor having a cache memory that can be accessed by utilizing an effective address, wherein said effective address includes a byte field, a line field, and an effective page number field, wherein said cache memory includes a memory array along with a directory and a translation lookaside buffer, said processor comprising:

a translation array that includes an identical number of rows as in said translation lookaside buffer, and an identical number of array entries within each row as the product of cache lines per page of a system memory and an associativity of said cache memory; and means for determining whether or not said cache memory stores data associated with said effective address utilizing said translation array, in response to a cache access by an effective address.

7. The processor according to claim 6, wherein said determining means further includes a means for utilizing a line field of said effective address to access said translation array.

8. The processor according to claim 7, wherein said determining means further includes a means for detecting one of said array entries having an indication of a match.

9. The processor according to claim 6, wherein said processor further includes a means for updating said translation array after the contents within said directory or said translation lookaside buffer has been updated.

10. The processor according to claim 6, wherein said directory contains real page numbers and said translation lookaside buffer is for translating effective page numbers to real page numbers.

* * * * *

UNITED STATES PATENT AND TRADEMARK OFFICE
CERTIFICATE OF CORRECTION

PATENT NO.     : 6,574,698 B1                                                          Page 1 of 1
DATED          : June 3, 2003
INVENTOR(S)    : Sang Hoo Dhong et al.

It is certified that error appears in the above-identified patent and that said Letters Patent is hereby corrected as shown below:

Column 2,
Line 63, please delete the word "so" between the words "cache" and "memory".

Signed and Sealed this

Fourteenth Day of October, 2003

JAMES E. ROGAN
*Director of the United States Patent and Trademark Office*